United States Patent
Seong

[11] Patent Number: 5,880,566
[45] Date of Patent: Mar. 9, 1999

[54] ABSOLUTE ANGULAR POSITION CALCULATION APPARATUS FOR A ROTATING MOTOR AND VELOCITY CONTROL APPARATUS ADOPTING THE SAME

[75] Inventor: Goan-Soo Seong, Seoul, Rep. of Korea

[73] Assignee: Samsung Electronics Co., Ltd., Kyungki-Do, Rep. of Korea

[21] Appl. No.: 897,975

[22] Filed: Jul. 21, 1997

[30] Foreign Application Priority Data

Jul. 19, 1996 [KR] Rep. of Korea ............... 96-29412

[51] Int. Cl.$^6$ .................................................. H02P 5/00
[52] U.S. Cl. ........................ 318/463; 318/449; 318/618
[58] Field of Search ................................. 318/138, 254, 318/268, 439, 461, 463, 464, 600–605, 618, 652, 449

[56] References Cited

U.S. PATENT DOCUMENTS

| | | |
|---|---|---|
| 4,501,997 | 2/1985 | Müller ................................ 318/254 |
| 4,531,079 | 7/1985 | Müller ................................ 318/254 |
| 4,551,715 | 11/1985 | Durbin . | 
| 4,862,045 | 8/1989 | Gleim et al. ...................... 318/254 |
| 4,899,093 | 2/1990 | Gleim ................................. 318/254 |
| 5,003,239 | 3/1991 | Matthews et al. ................ 318/600 |
| 5,552,682 | 9/1996 | Ushikoshi ......................... 318/254 |

*Primary Examiner*—Bentsu Ro
*Attorney, Agent, or Firm*—Sughrue, Mion, Zinn, Macpeak & Seas, PLLC

[57] ABSTRACT

An absolute angular position calculator for a rotating motor and a velocity control apparatus adopting the same, in which a separate pulse generator is not used. The motor is manufactured so that a modified frequency generator generates a modified frequency signal by removing one pulse from the predetermined number of pulses of a frequency signal, by changing a duty of one pulse of the frequency signal, or by changing a magnitude of the frequency signal. When the motor is in use, a modification point of the frequency signal is detected to produce an absolute angular position which is used for producing a disturbance correction value, via learning, to be stored. Velocity control is performed using the stored disturbance correction value. Thus, the disturbance correction value is determined and stored via one-time learning and the stored disturbance correction value is used for a velocity control of the motor, thereby reducing the burden with respect to storage capacity of data and transient time of the motor for velocity control compared to the case where disturbance correction values obtained via repetition learning are continuously stored.

9 Claims, 5 Drawing Sheets

N-2   N-1   N   N+1

N-2           0     1

N-2   N-1    0     1

ABSOLUTE ANGULAR POSITION CALCULATION APPARATUS FOR A ROTATING MOTOR AND VELOCITY CONTROL APPARATUS ADOPTING THE SAME

BACKGROUND OF THE INVENTION

The present invention relates to a velocity control apparatus for a rotating motor, and more particularly, to an absolute angular position calculation apparatus which calculates an absolute angular position of a rotating motor, to thereby obtain a reference position for velocity control, and a velocity control apparatus adopting the same.

A rotating motor such as a capstan motor includes a frequency generator for generating a frequency signal according to a rotating velocity. The frequency signal FG generated at a pulse period by a certain interval of angle in the frequency generator is used for velocity control.

FIG. 1A is a waveform diagram showing a frequency signal FG generated according to a rotating velocity of a conventional motor. FIG. 1B shows a counter 10 for measuring a pulse period of the frequency signal FG. The period measurement counter 10 is synchronized with a high frequency clock CLK and counts the number cycles of the clock CLK generated during a pulse interval of the frequency signal FG generated from the rotating motor to measure the period of the frequency signal FG. The measured period is used for velocity control of the motor. Korean Patent Application No. 95-19515 filed on Jul. 4, 1995 by the same assignee as that of the present application, discloses an apparatus for estimating a disturbance and removing the disturbance using a repetition learning when the disturbance per revolution of a motor which is used for an apparatus such as a video cassette recorder (VCR) is input consistently, in order to enhance a velocity control performance of the motor.

FIG. 2 is a block diagram showing a velocity control apparatus of a conventional rotating motor disclosed in the above Korean Patent Application No. 95-19515. The conventional rotating motor velocity control apparatus disclosed in the above Korean Patent Application will be briefly described below.

In FIG. 2, a current velocity ω and an angular position θ which are calculated by a motor 25 are input to a first adder A1 and a learning compensator 27, respectively. The first adder A1 outputs a velocity error $\omega_e$ representing a difference between the current velocity ω of the motor 25 and a reference velocity ω*. The velocity error $\omega_e$ is input to a velocity controller 21. If the load torque with respect to the motor 25 is zero, then no load disturbance exists in the motor and the velocity controller 21 can obtain an excellent velocity control characteristic using only a general velocity control. However, if a load torque exists, then a velocity control characteristic is lowered and the learning compensator 27 removes a disturbance of the motor, which is expressed as a function of angular position and angular velocity, using a repetition learning.

The learning compensator 27 receives an output $i_v^*$ from the velocity controller 21 and the angular position θ, and produces an output for removing an influence of the disturbance. A disturbance compensation command $i_{LK}^*(\theta)$ obtained by the learning compensator 27 is input to a second adder A2. The second adder A2 adds a current command $i_v^*$ applied from the velocity controller 21 and the disturbance compensation command $i_{LK}^*(\theta)$ applied from the learning compensator 27 to generate a modified current command i*.

The current controller 23 receives the modified current command i* from adder A2 and outputs a torque command to the motor 25 in response to the input current command i. A third adder A3 in the motor 25 subtracts the applied disturbance H (θ,θ̇) from the torque command applied from the current controller 23 and outputs a modified torque command τ*. A velocity of a motor 25' which is expressed as a transfer function of 1/(JS+B) is controlled according to the torque command τ*. In the result of velocity control, the angular velocity ω output from the motor 25 is fed back to the first adder A1 and is used for calculation of a velocity error $\omega_e$ together with the velocity command ω*. The velocity error $\omega_e$ is input to the velocity controller 21 which outputs a current command for controlling a rotating velocity of the motor 25 according to the input velocity error. The current command is input to the learning compensator 27. The angular velocity ω is output as an angular position θ via a motor 25", expressed as a transfer function of 1/S, and is fed back to the learning compensator 27.

As described above, the learning compensator 27 requires the angular position θ as an input. To obtain the angular position θ, a signal representing an absolute angle of the motor 25 is needed. A pulse generator generates a pulse signal having a pulse per revolution of the motor. The absolute angular position of the motor is calculated from the pulse signal. However, only the frequency signal generated with a uniform interval of angle is available since the conventional motor has only a frequency generator. Thus, an absolute angular position cannot be obtained. Instead, a relative angular position can be determined by counting the number of the frequency signal FG based on an arbitrary reference position. Therefore, whenever power is turned on or a motor starts to rotate, the learning compensator 27 is repetitively learned on the basis of an arbitrary reference position.

However, in the case of a learning control by a relative angular a learning should be performed for every starting, which results in an increased transient time until the motor is stabilized. Also, since the learned data is changed for each time, a storage medium having a capacity proportional to the number of pulses of the frequency signal is required to store the data, for example, a random access memory (RAM). Furthermore, a pulse generator may be attached to the motor, which can increase the cost of the motor.

SUMMARY OF THE INVENTION

To solve the above problems, it is an object of the present invention to provide an absolute angular position calculation apparatus for generating an absolute angular position necessary for controlling the velocity of a motor using only a frequency generator without using a separate pulse generator, thereby reducing manufacturing cost of the motor.

It is another object of the present invention to provide a velocity control apparatus in which a disturbance correction value, obtained via a repetition learning control method using an absolute angle calculated in the absolute angular position calculation apparatus, is stored and continuously used, thereby minimizing a transient time to be taken for stabilization of a rotating motor.

To accomplish the above object of the present invention, there is provided absolute angular position calculation apparatus for a rotating motor, the absolute angular position calculation apparatus comprising:

a frequency generator for generating a frequency signal whose pulse pattern is modified from a predetermined pattern and is synchronized with a frequency signal according to a rotating velocity of the motor; a frequency modification point detector for detecting a frequency modification point with respect to the modified frequency signal generated by the frequency generator; and an absolute angle producer for receiving the detected frequency modification point as a reset signal, counting pulses of the frequency signal, and producing an absolute angular position.

To accomplish another object of the present invention, there is provided velocity control apparatus for a rotating motor using an absolute angular position, the velocity control apparatus comprising:

a first adder for comparing an input frequency signal period command with an input current period to obtain a period error; a velocity controller for receiving the obtained period error and outputting a current command for controlling a rotating velocity for the motor; a learning compensator for receiving the current command output from the velocity controller and an absolute angular position, and correcting an influence of a disturbance expressed as a function of an angular position and an angular velocity applied to the motor via a repetition learning; a second adder for adding the current command output from the velocity controller and the disturbance correction value obtained by the learning compensator to obtain a modified current command; a current controller for receiving the obtained current command and outputting a torque command to the motor; a frequency generator for generating a modified frequency signal according to a rotating velocity of the motor whose rotating velocity is controlled according to the torque command output from the current controller; and an absolute angular position calculator for receiving the modified frequency signal, detecting and outputting a current period of the modified frequency signal to the first adder, calculating an absolute angular position based on the frequency modification point and outputting the calculated absolute angular position to the learning compensator.

BRIEF DESCRIPTION OF THE DRAWINGS

The present invention will be described in more detail with reference to the accompanying drawings in which.

DETAILED DESCRIPTION OF THE PREFERRED EMBODIMENT

A preferred embodiment of the present invention will be described in detail with reference to the accompanying drawings.

Figure 3A:
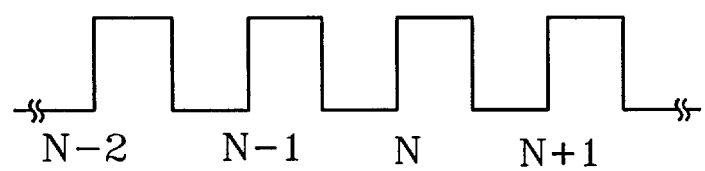
FIGS. 3A through 3D are waveform diagrams showing modified frequency signals to calculate an absolute angular position for a rotating motor according to the present invention.

Prior to describing a modified frequency signal FG according to the present invention, a conventional frequency signal will be described with reference to FIG. 3A. A conventional motor includes a frequency generator which is installed in the periphery of a rotating portion of the motor and is uniformly magnetized. The frequency generator detects rotation of the motor by means of a magnetic sensor, and generates a frequency signal FG having a predetermined period according to a rotating velocity of the motor, as shown in FIG. 3A.

Figure 3B:
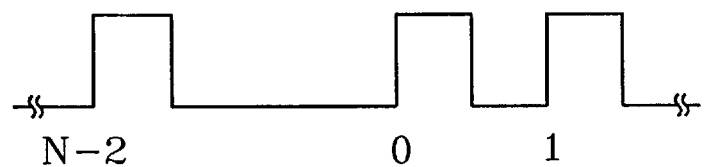
Figure 3C:
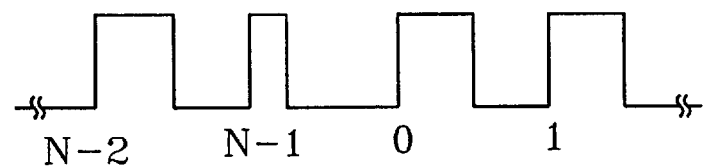
Figure 3D:
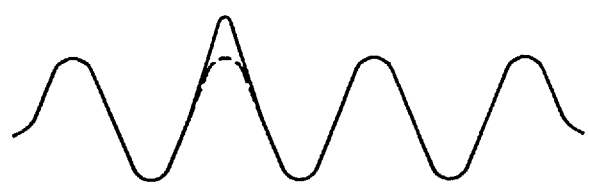

The present invention uses a frequency generator which generates a frequency signal modified from a predetermined pattern, to generate a modified frequency signal FG according to a rotating velocity of the motor. That is, as shown in FIG. 3B, the frequency generator is magnetized so that a modified frequency signal is generated by removing a magnetization of a point (N-1) at a predetermined pattern with which the motor is uniformly magnetized. Otherwise, as shown in FIG. 3C, the frequency generator is magnetized so that a modified frequency signal is generated by changing a duty of the frequency signal by one pulse from a predetermined pattern. In addition, as shown in FIG. 3D, the frequency generator is magnetized so that a modified frequency signal is generated by changing a magnitude of the frequency signal by one pulse from a predetermined pattern. Using the above modified frequency signal FG, an absolute angular position is calculated.

Figure 4:
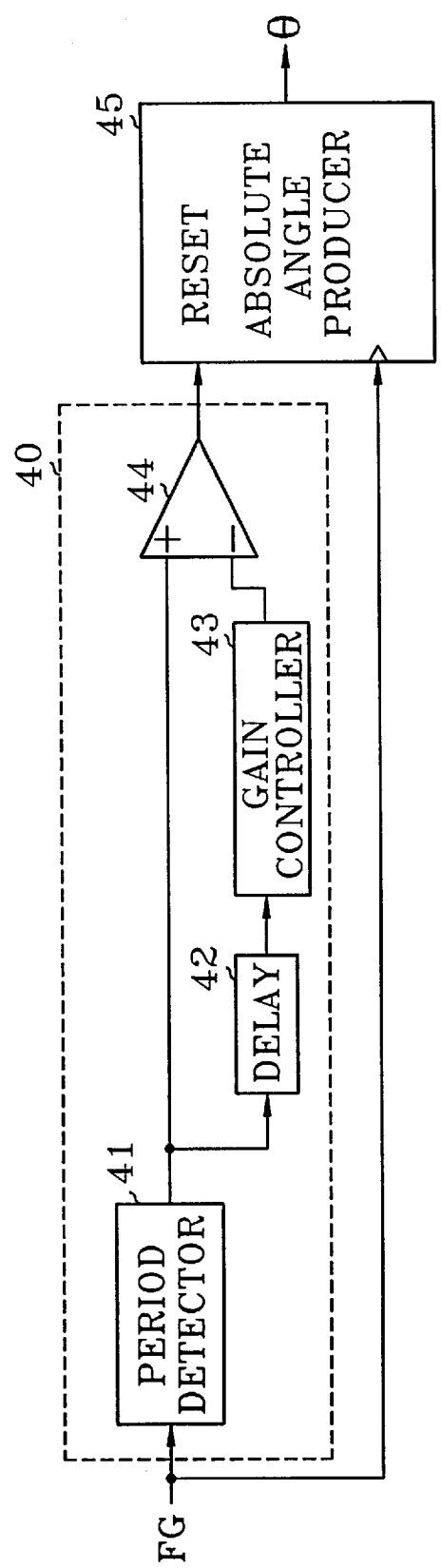
FIG. 4 is a block diagram showing an absolute angular position calculation apparatus for a rotating motor according to the present invention.

FIG. 4 is a block diagram showing an absolute angular position calculation apparatus according to the present invention. A frequency modification point detector 40 receives the frequency signal FG generated according to rotation of the motor and detects a frequency modification point. An absolute angle producer 45 counts the number of pulses of the frequency signal FG generated according to rotation of the motor and produces an absolute angular position, using the detected frequency modification point as a reset signal. The frequency modification point detector 40 includes a period detector 41 for receiving the frequency signal FG and detecting the period thereof. A delay 42 delays the detected period and outputs the delayed result. A gain controller 43 adjusts the gain of the delayed period. A comparator 44 compares the period detected in the period detector 41 with the previous period whose gain is adjusted in the gain controller 43. The functions of the frequency modification point detector 40 and the absolute angle producer 45 can be processed by software in a microcomputer.

Figure 1A:
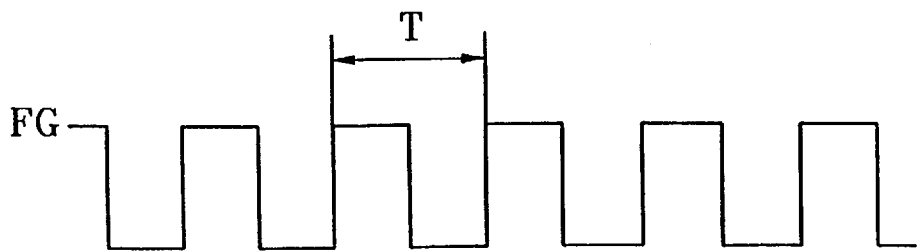
FIG. 1A is a waveform diagram showing a frequency signal generated according to a rotating velocity of a conventional motor.
Figure 1B:
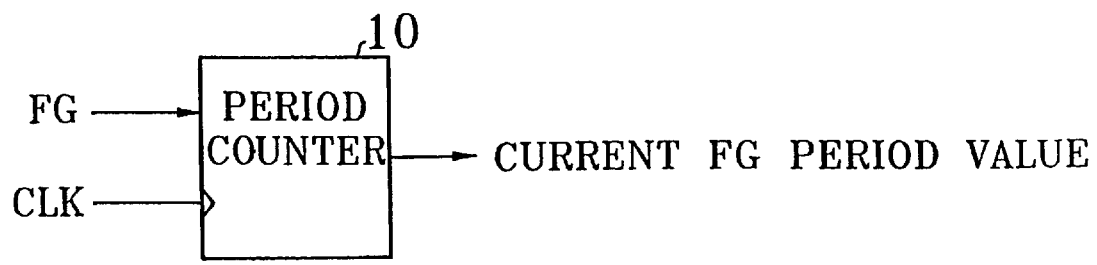
FIG. 1B shows a counter for measuring a period of the frequency signal.
Figure 2:
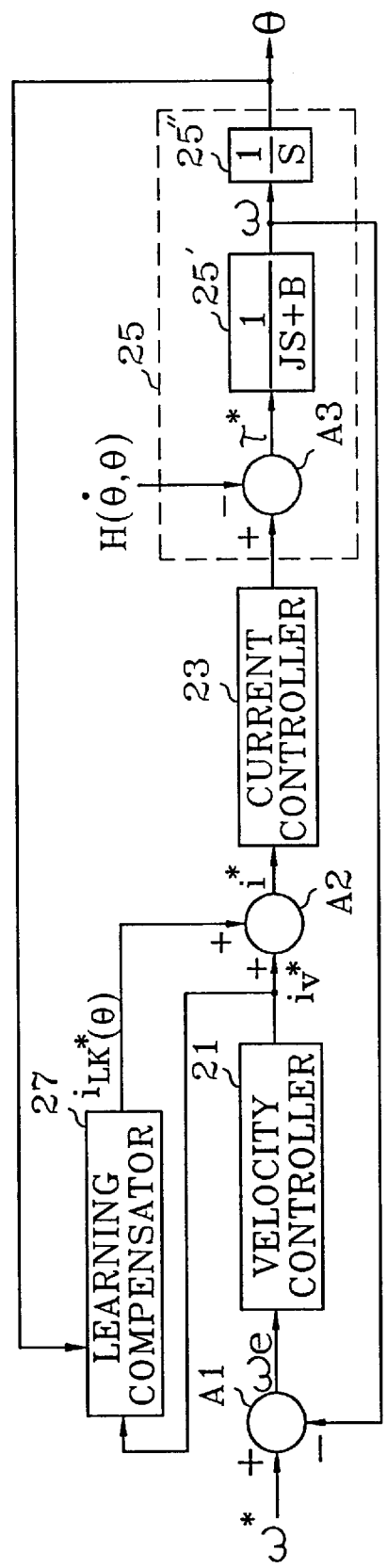
FIG. 2 is a block diagram showing a velocity control apparatus for a conventional rotating motor.
Figure 5:
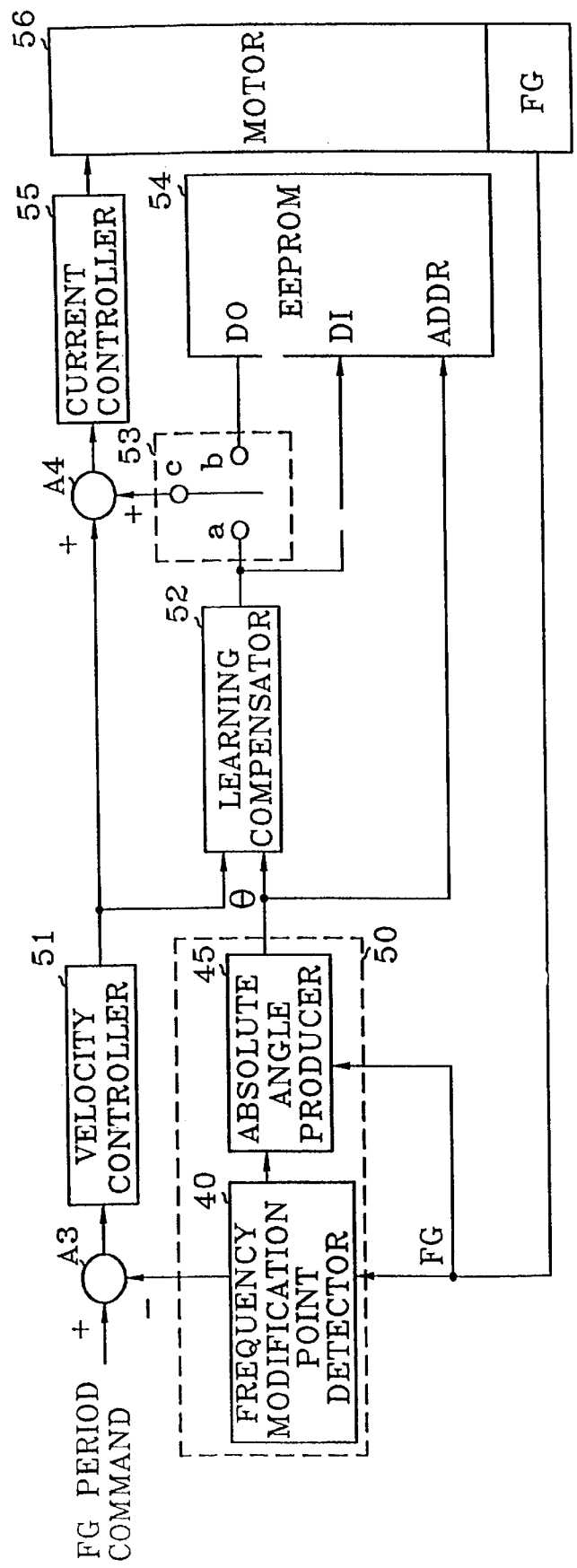
FIG. 5 is a block diagram showing a velocity control apparatus for a rotating motor in which an absolute angular calculation apparatus of FIG. 4 is adapted.

FIG. 5 is a block diagram showing a velocity control apparatus for a rotating motor in which the absolute angular calculation apparatus of FIG. 4 is adapted. Although, the velocity control apparatus of FIG. 5 is similar to the conventional apparatus shown in FIG. 2, the velocity control apparatus according to the present invention further includes an absolute angular position calculator 50 and a learning value storage portion 54. The absolute angular position calculator 50 receives the frequency signal FG generated according to rotation of a motor 56 to calculate an absolute angular position θ and outputs the calculated absolute angular position θ to a learning compensator 52. The learning value storage portion 54 stores a disturbance correction value obtained via a repetition learning in the learning compensator 52. The learning value storage portion 54 uses a storage medium such as an EEPROM, a PROM, and a flash memory. In the preferred embodiment, an EEPROM is used. Additionally, the velocity control apparatus further includes a switch 53 for selectively outputting the disturbance correction value obtained by the learning compensator 52 and the disturbance correction value stored in the learning value storage portion 54.

Hereinafter, the operations of the absolute angular position calculation apparatus for a rotating motor and the velocity control apparatus adopting the absolute angular position calculation apparatus will be described with reference to FIG. 4 and FIG. 5.

First, the motor 56 is driven using a constant velocity control with a constant voltage during mass production. The modified frequency signal FG generated by a frequency generator 57 according to rotation of the motor 56 (see FIGS. 3B through 3D) is input to the absolute angular position calculator 50. A frequency modification point detector 40 in the absolute angular position calculator 50 detects a period from the input frequency signal FG and outputs it to the first adder A3. The frequency modification point detector 40 also detects the frequency modification point and outputs it to the absolute angular producer 45. The absolute angular position calculator 50 will be described with reference to FIG. 4.

If a frequency signal FG modified into an (N−1) pulse period, obtained by subtracting one from the uniformly magnetized N pulses in the frequency generator as shown in FIG. 3B, is input to the motor 56, then the modified frequency signal FG generated in the frequency generator according to rotation of the motor 56 is input to a period detector 41 in the frequency modification point detector 40, and to a clock terminal of the absolute angle producer 45. The period detector 41 detects the period of the input frequency signal FG and outputs it to a comparator 44 and a delay 42.

If a frequency signal FG whose duty of one pulse is modified as shown in FIG. 3C is input to the absolute angular position calculator 50, the frequency modification point detector 40 detects a pulse width instead of detection of the period. Furthermore, if a frequency signal FG whose magnitude of one pulse is modified as shown in FIG. 3D is input, then the frequency modification point detector 40 detects the magnitude of the input frequency signal FG instead of detecting the period or the pulse width.

The delay 42 receives the period detected from the period detector 41 and delays the received period by one period of the frequency signal FG. The gain controller 43 receives the previous period detected from the delay 42 and adjusts the gain, to then output the result to the comparator 44. The gain controller 43 then adjusts the gain of the previous period using a value in the range from "1" to an integer as a gain. The integer is obtained by adding one to the number of the magnetized pulses subtracted from the number of the magnetized N pulses in the frequency generator. This is because although a frequency signal having the same period is not generated, a small error may occur even though a frequency generator 57 has been uniformly magnetized under a physical control. For example, if one is subtracted from the number of the magnetized pulses, the gain of the gain controller 43 becomes a value between 1 and 2, more preferably an average value between 1 and 2, i.e., 1.5. The comparator 44 compares the input two period values and detects a point where the currently detected period is larger than the previously detected period as a frequency modification point. If an object to be compared is a duty, a point where the currently detected pulsewidth is wider than the previously detected pulsewidth can be detected as a frequency modification point. If an object to be compared is a magnitude, a point where the currently detected magnitude is larger than the previously detected magnitude can be detected as a frequency modification point. Whenever the frequency modification point is detected via the comparator 44 in the frequency modification point detector 40, the absolute angle producer 45 is reset and counts the number of pulse of the modified frequency signal FG generated according to rotation of the motor 56 to calculate an absolute angular position. That is, the number of pulses of the frequency signal FG-per one revolution of the motor 56 decreases by one and becomes (N−1), and an angle corresponding to "(360°/N)×count value" with respect to the position reference signal is output as the absolute angular position θ. Here, a control degradation which may occur at the point where a pulse of the frequency signal is missing can be prevented by the learning compensator 52 which performs a feed-forward control. The absolute angular position is input to the learning compensator 52. The current period value detected from the frequency modification point detector 40 is input to the first adder A3.

Returning to FIG. 5, the first adder A3 compares the period command of the input frequency signal FG with the current period detected in the frequency modification point detector 40 to output a period error. The velocity controller 51 which receives the period error output from the first adder A3 uses a proportional integration (PI) controller to obtain a current command based on the period error. The learning compensator 52 learns a disturbance correction value with respect to the input current command by being driven based on the absolute angular position output from the absolute angle producer 45. The disturbance compensation command obtained by the learning compensator 52 is input to the second adder A4 via the switch 53. The second adder A4 adds the current command applied from the velocity controller 51 and the disturbance compensation command output from the learning compensator 52 via the switch 53 and outputs a modified current command. The modified current command is input to the current controller 55. The current controller 55 outputs a torque command in response to the input current command to the motor 56. The motor 56 rotates at a velocity corresponding to the torque command applied from the current controller 55. Whenever a learning corresponding to one rotation of the motor 56 is completed, the learning compensator 52 stores the disturbance correction value obtained and compares the input current command received from the velocity controller 51 with a predetermined threshold value to judge whether the disturbance applied to the motor 56 has been sufficiently compensated. The learning compensator 52 stores the disturbance correction value in the learning value storage portion 54 comprising an EEPROM if it is judged that the disturbance applied to the motor 56 has been sufficiently compensated.

Meanwhile, during use, the motor 56 is driven using a constant velocity control with a constant voltage, and the absolute angular position is calculated in the same manner as that used during mass production. The calculated absolute angular position is used as an address ADDR of the learning value storage portion 54 and the disturbance correction value stored in a position designated by the address is output. Thus, in the velocity control according to the present invention, the output of the velocity controller 51 is added to the predetermined disturbance correction value which is stored in the learning value storage portion 54 and is supplied through the switch 53 to the adder A4, in order to correct a periodic disturbance of the motor 56, thereby performing an efficient velocity control.

As described above, an absolute angular position calculator for a rotating motor according to the present invention uses only a modified frequency generator without a separate pulse generator, to produce an absolute angular position of the motor from the modified frequency signal. Accordingly, further costs due to addition of a separate pulse generator are eliminated. Furthermore, according to a velocity control apparatus for a rotating motor employing the absolute angular position calculator, a disturbance correction value is determined and stored via one-time learning using the produced absolute angular position, and the stored disturbance correction value is used for a velocity control of the motor. Therefore, the burden with respect to storage capacity of data and transient time of the motor for velocity control can be reduced compared to the case where disturbance correction values obtained via repetition learning are continuously stored.

While only certain embodiments of the invention have been specifically described herein, it will be apparent that numerous modifications may be made thereto without departing from the spirit and scope of the invention.

What is claimed is:

1. An absolute angular position calculation apparatus for a rotating motor, comprising:

a frequency generator for generating a modified frequency signal whose pulse pattern is modified from a predetermined pattern and is synchronized with a frequency signal according to a rotating velocity of the motor by removing a magnetized pulse of a position from the predetermined pattern which is uniformly magnetized in the motor;

a frequency modification point detector for detecting a frequency modification point with respect to the modified frequency signal generated by the frequency generator, said frequency modification point detector receiving said modified frequency signal from said frequency generator; and an absolute angle producer for receiving the detected frequency modification point from said frequency modification point detector as a reset signal, counting pulses of the frequency signal, and producing an absolute angular position.

2. The absolute angular position calculation apparatus according to claim 1, wherein said frequency modification point detector comprises:

a period detector for receiving the modified frequency signal generated according to rotation of the motor and detecting a period;

a delay for delaying the detected period by one period and outputting the result;

a gain controller for controlling the gain of the delayed previously detected period; and a comparator for comparing the detected current period with the gain-controlled previous period, and detecting a position where the current period is longer than the previous period as a frequency modification point.

3. The absolute angular position calculation apparatus according to claim 2, wherein said gain controller controls the gain of the previous period using, as a gain, a value between one and an integer obtained by adding one to the number of the magnetized pulses subtracted from the frequency generator.

4. The absolute angular position calculation apparatus according to claim 1, wherein said absolute angle producer obtains an angle corresponding to {(360°/N)×count value} with respect to the frequency modification point obtained by the frequency modification point detector if the number of pulses of the frequency signal per revolution of the motor becomes (N−1) in which N is the number of the magnetized pulses in the frequency generator.

5. An absolute angular position calculation apparatus for a rotating motor, comprising:

a frequency generator for generating a modified frequency signal whose pulse pattern is modified from a predetermined pattern and is synchronized with a frequency signal according to a rotating velocity of the motor by changing a duty of a only one pulse of the frequency signal from the predetermined pattern;

a frequency modification point detector for detecting a frequency modification point with respect to the modified frequency signal generated by the frequency generator, said frequency modification point detector receiving said modified frequency signal from said frequency generator; and an absolute angle producer for receiving the detected frequency modification point from said frequency modification point detector as a reset signal, counting pulses of the frequency signal, and producing an absolute angular position.

6. The absolute angular position calculation apparatus according to claim 5, wherein said frequency modification point detector detects the pulsewidth of the frequency signal, compares the detected current pulsewidth with the previous pulsewidth, and detects a position where the current pulsewidth is wider than the previous pulsewidth as a frequency modification point.

7. An absolute angular position calculation apparatus for a rotating motor, comprising:

a modified frequency generator for generating a modified frequency signal whose pulse pattern is modified from a predetermined pattern and is synchronized with a frequency signal according to a rotating velocity of the motor by changing a magnitude of only one pulse of the frequency signal from the predetermined pattern;

a frequency modification point detector for receiving said modified frequency signal from said frequency generator and detecting a frequency modification point with respect to the modified frequency signal generated by the frequency generator, wherein said frequency modification point detector detects the magnitude of the frequency signal, comparing the detected current magnitude with the previous magnitude, and detects a position where the current magnitude is larger than the previous magnitude; and an absolute angle producer for receiving the detected frequency modification point from said frequency modification point detector as a reset signal, counting pulses of the frequency signal, and producing an absolute angular position.

8. A velocity control apparatus for a rotating motor using an absolute angular position, the velocity control apparatus comprising:

a first adder for comparing an input frequency signal period command with an input current period to obtain a period error; a velocity controller for outputting a current command for controlling the rotating velocity for the motor, said velocity controller receiving the obtained period error from said first adder;

a learning compensator for receiving the current command output from the velocity controller and an absolute angular position, and correcting an influence of a disturbance expressed as a function of an angular position and an angular velocity applied to the motor via a repetition learning;

a second adder for adding the current command output from the velocity controller and the disturbance correction value obtained by the learning compensator to obtain a modified current command;

a current controller for receiving the obtained current command and outputting a torque command to the motor;

a frequency generator for generating a modified frequency signal according to a rotating velocity of the motor whose rotating velocity is controlled according to the torque command output from the current controller;

an absolute angular position calculator for receiving the modified frequency signal, detecting and outputting a current period of the modified frequency signal to the first adder, calculating an absolute angular position based on the frequency modification point and outputting the calculated absolute angular position to the learning compensator; and a learning value storage portion connected to said learning compensator for storing the disturbance correction value in the case when a compensation with respect to the disturbance applied to the motor is performed by the disturbance correction value obtained via a repetition learning in units of one revolution of the motor, and receiving the absolute angular position calculated in the absolute angular position calculator, thereby outputting the disturbance correction value stored in a position designated by the address.

9. The velocity control apparatus according to claim 8, further comprising a switch located between said learning compensator and said learning value storage portion, wherein said switch selects the disturbance correction value obtained in the learning compensator and outputs the selected result to the second adder when the motor is under mass production, and wherein said switch selects the disturbance correction value read form the learning value storage portion and outputs the selected result to the second adder when the motor is in use.

* * * * *